Patented Nov. 17, 1925.

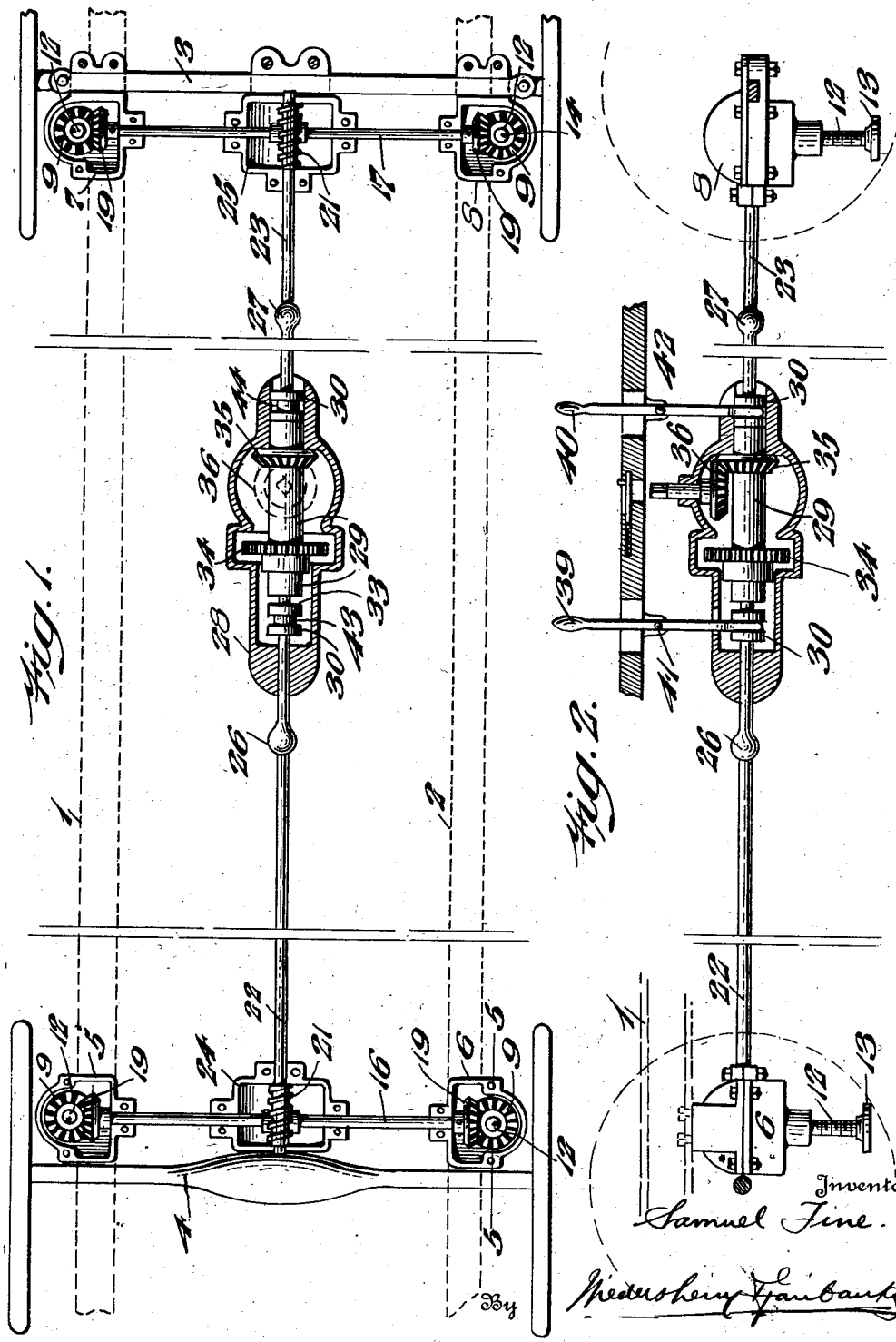

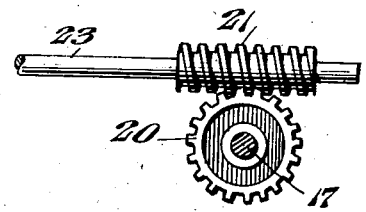
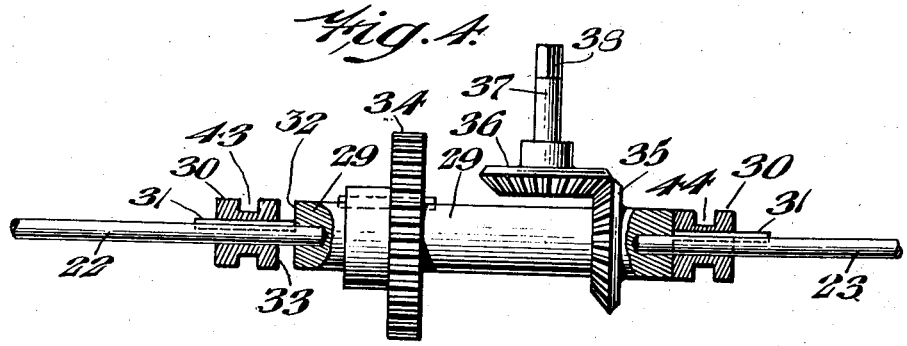
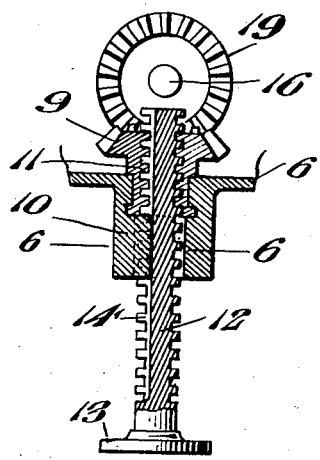
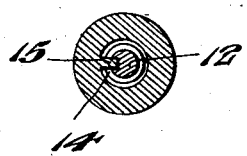

1,562,214

UNITED STATES PATENT OFFICE.

SAMUEL FINE, OF PHILADELPHIA, PENNSYLVANIA.

POWER JACK.

Application filed March 9, 1925. Serial No. 13,984.

*To all whom it may concern:*

Be it known that I, SAMUEL FINE, a citizen of the United States, and residing in Philadelphia, in the county of Philadelphia and State of Pennsylvania, have invented a certain new and useful Power Jack, of which the following is a specification.

My invention relates to a new and useful multiple jack adapted to be attached permanently to the chassis of an automobile or other similar vehicle, and adapted to be actuated or driven either manually or with the power of the engine of the automobile.

My invention further relates to a novel multiple power jack of the character stated, having a separate jack at each wheel, or near each corner of the vehicle, the two jacks at the front and rear ends respectively being permanently interconnected so as to raise the whole front or the whole rear of the vehicle simultaneously, and means whereby the power may be applied to either the front or rear jacks at will.

With the above ends in view, my invention consists of a screw or other jack, located near each wheel of the automobile, and contained within a casing secured permanently to the chassis or axles of the automobile.

My invention further consists of transverse shafts and suitable gears thereon, interconnecting the front jacks on the two sides of the automobile, and the rear jacks on the two sides of the automobile, a gear box operatively connected with the engine drive shafts, longitudinal shafts connecting each of the front and rear transverse shafts respectively, with said gear box, and clutches for operatively connecting said front and rear longitudinal shafts with the gear box.

The objects of my invention are first to provide power driven means for raising the front or rear of an automobile, or both, from the ground; both for repairs to the body of the automobile as well as to the tires or wheels, or to raise the car from the ground at all four corners, in such a manner as thereby to lock the car against theft. For the latter purpose my novel multiple power jack is particularly advantageous since with the car raised from the ground on four rigid supports, the car can neither be driven away, or towed away, even though one end thereof may be lifted by the towing vehicle. By properly locking either the entrance of the car, as in the case of closed cars, or by suitably locking the jack actuating mechanisms, the car may be locked and secured in its raised or jacked up position, against theft, in a more effective manner than has been done heretofore.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, in which like reference characters indicate like parts:—

Fig. 1. represents a plan view partly in section of a novel power jack, as applied to the chassis of an automobile indicated in dotted lines, embodying my invention.

Fig. 2. represents a side elevation of the same, partly in section.

Fig. 3. represents a detail of the worm gear drive between the front and the rear transverse jack shafts and the longitudinal driving shafts therefor.

Fig. 4 represents a detailed view, partly in section, showing the elements of the gear box and the clutches for engaging the front and rear jacks respectively.

Fig. 5 is substantially a sectional view of one of the jacks.

Fig. 6. represents a section on line 6—6 of Fig. 5.

Referring to the drawings 1 and 2 designate the longitudinal frame members of the chassis of an automobile, shown in dotted lines, having attached thereto in the usual manner, the front axle 3 and the rear axle 4, which are represented in the drawings only in a diagrammatic or schematic way. 5, 6, 7 and 8 designate the four jack casings at the front and rear ends of the car, secured in any suitable manner to either the frame members as for instance the rear jack casings 5 and 6, or secured in any suitable manner to the axle as shown at 3. Each of the jack casings 5, 6, 7 and 8 is provided with bevel gear 9, suitably journaled within the lower projecting portion 10, of the casing, and having an internal screw thread of suitable shape, either of the square or the acme type, in which screw thread 11, is adapted to travel, a similarly threaded jack 12, having the base portion 13, at the lower end thereof. The jack screw 12, moreover is provided a key slot 14 extending the length thereof, parallel to its axis; which key slot is engaged by a suitable key 15 carried by the lower portion 10 of the housing of the jack. Thus upon turning or revolving the bevel gear 9, the jack screw 12 will either be raised or lowered, thereby lowering or raising the car respectively. The jacks 5 and 6 on one hand, and the jacks 7 and 8 on the other, are interconnected in a permanent manner by means of the transverse jack shafts 16 and 17 respectively extending transversely of the car, suitably journaled within the jack casing, and carrying corresponding beveled gears 19 at the ends thereof, in mesh with the beveled gears 9 which actuate the jack screws 21. Each of the transverse jack shafts 16 and 17 carries a gear 20 at any suitable point along its length, which is in mesh with the worm 21 carried by the longitudinal drive shafts 22 and 23 respectively; said shafts 22 and 23 being suitably journaled within the gear casings 24 and 25 respectively; as shown in Figs. 1 and 2. Each of the longitudinal shafts 22 and 23 has inserted a universal joint, 26 and 27 respectively, to permit the deflection of the shafts in order to allow for relative displacement of the jacks and the gear box, without undue strain. Each of the shafts 22 and 23 enters, and is journaled within the trunnions of a suitable power shaft 29, carried within said gear box and is free to revolve relative thereto. In order to effect an operative engagement between the trunnion 29 and the respective shafts 22 and 23, each of the said shafts carries a clutch disc 30, slidably mounted thereon, by means of the key 31 and a suitable key slot in the clutch disc and shaft respectively, while the end of the trunnion is provided with a clutch face 32 adapted to be engaged by the similar face 33, of said clutch disc. Thus in order to effect an operative engagement with either the front or rear jacks respectively, it is only necessary to force the corresponding clutch disc into engagement with the respective trunnion end of the power shaft 29. The power shaft 29 carries a pinion 34, as well as the beveled gear 35; the former being adapted for power drive while the latter is adapted for the manual operation of jacks, it being in mesh with the corresponding beveled gear 36, carried by the shaft 37, having a square end 38, adapted to receive a suitable socket wrench or key. The gear 34 is driven through a suitable gear connection, from the shaft of the engine, not shown in th drawings. The clutch levers 39 and 40 respectively, pivoted at the points 41 and 42, and engaging the annular grooves 43 and 44 respectively in the corresponding clutch discs, are adapted to force the clutch discs into operative engagement with the clutch faces 32 of the power shaft 29, in order thereby to drive the front or rear jacks respectively.

In order to permit the reversal of the jacks either up or down, the motion of the power shaft is reversed. This may be accomplished by any suitable means, as by the reversal of the gear connection with the engine shaft of the car, in a manner similar to the reverse obtained from the gear shift box of a car, as commonly found in automobile construction. Thus I may provide a double gear connection for the gear 34, whereby the same may be engaged with the engine shaft in two directions in a manner similar to the forward and reverse connections of the engine shaft and the driving shaft, as accomplished in the usual gear box of the car.

It will now be apparent that I have devised a novel and useful construction in a power jack which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a device of the character stated, a casing, a power shaft therein having end trunnions, bearings in said trunnions, driven shafts having their inner ends mounted in said bearings and their outer ends adapted to actuate a plurality of jacks positioned at the four corners of a chassis, sliding clutch members mounted on the ends of said driving shafts in proximity to said end trunnions, an operating lever for each of said sliding clutch members, a gear on said power shaft intermediate of said clutch members and manually operated gearing located intermediate said clutch operating levers for rotating said power shaft in either direction.

2. In a device of the character stated, a casing, a power shaft therein having end trunnions, bearings in said trunnions, driven shafts having their inner ends mounted in said bearings and their outer ends adapted to actuate a plurality of jacks, positioned at the four corners of a chassis, sliding clutch members mounted on the ends of said driving shafts in proximity to said end trunnions, an operating lever for each of said sliding clutch members, a gear on said power shaft intermediate of said clutch members and manually operated gearing located intermediate said clutch operating levers for rotating said power shaft in either direction, in combination with another gear member mounted on said power shaft intermediately of said clutch members for enabling said power shaft to be driven from the engine.

3. In a device of the character stated, an automobile chassis, a screw jack, carried by and near each corner of the chassis, each of said jacks comprising a beveled gear rotatably mounted within said housing and having a vertical axis of rotation, a jack in an upright position, a second beveled gear in mesh with said first beveled gear rotatably mounted in said housing, having a horizontal axis of rotation, a horizontal shaft interconnecting the two horizontally mounted beveled gears at each end of the car, worm gears carried by each of said horizontal transverse shafts and longitudinally extending shafts extending to said transverse shafts and carrying a worm in mesh with each of said worm gears for operating said screw jacks, each of said horizontal longitudinal shafts being rotatably mounted in a gear and clutch housing a power shaft, power shaft trunnions interposed between the ends of said two shafts, and having friction clutch faces at their ends, driven friction discs slidably mounted on the ends of said shafts in juxtaposition to the driving friction clutch faces of said trunnions, each of said clutches being composed of frictional driven members slidably mounted on the end of each respective longitudinal shaft and a frictional driving member at each trunnion end of said power shaft manually operated means located between said clutch mechanism for driving said power shaft in either direction, and separate levers for actuating either of said driven members at will.

SAMUEL FINE.